United States Patent [19]
Pettengill et al.

[11] 3,780,505
[45] Dec. 25, 1973

[54] CROP CONDITIONER DRIVE

[75] Inventors: Donald Herbert Pettengill; Merlyn Duane Bass, both of Ottumwa, Iowa

[73] Assignee: Deere & Company, Moline, Ill.

[22] Filed: June 26, 1972

[21] Appl. No.: 266,298

[52] U.S. Cl............................ 56/14.4, 56/DIG. 1
[51] Int. Cl............................................. A01d 43/10
[58] Field of Search................ 56/DIG. 1, 192, 14.3, 56/14.4, 14.5

[56] References Cited
UNITED STATES PATENTS

| | | | |
|---|---|---|---|
| 3,599,405 | 8/1971 | Hurlburt | 56/DIG. 1 |
| 3,523,411 | 8/1970 | Waldrop et al. | 56/DIG. 1 |
| 3,509,699 | 5/1970 | Calder | 56/DIG. 1 |
| 3,324,639 | 6/1967 | Halls et al. | 56/14.4 |
| 3,309,850 | 3/1967 | Glass et al. | 56/DIG. 1 |

*Primary Examiner*—Louis G. Mancene
*Assistant Examiner*—J. N. Eskovitz
*Attorney*—H. Vincent Harsha et al.

[57] ABSTRACT

A self-propelled windrower has a forward transversely elongated auger-type platform with a central crop discharge opening, and a crop conditioning unit is mounted on the rear wall of the platform and conditions the crop as it moves through the discharge opening. The crop conditioner unit includes a pair of transverse conditioner rolls, which condition the crop as it passes between the rolls, the upper roll being journaled on a pair of vertically swingable arms to vary the clearance between the rolls. A header drive shaft extends forwardly from the propulsion unit and drives a transverse drive shaft, which is mounted on and spans the width of the rear wall of the platform. One end of the transverse drive shaft is connected by a belt drive to the input shaft of a gearbox mounted on the side of the platform, and the gearbox has two output shafts rotating in opposite directions and respectively connected to the upper and lower conditioner rolls by means of transverse drive shafts, which are provided with universal joints and are disposed adjacent to the rear wall of the platform.

7 Claims, 5 Drawing Figures

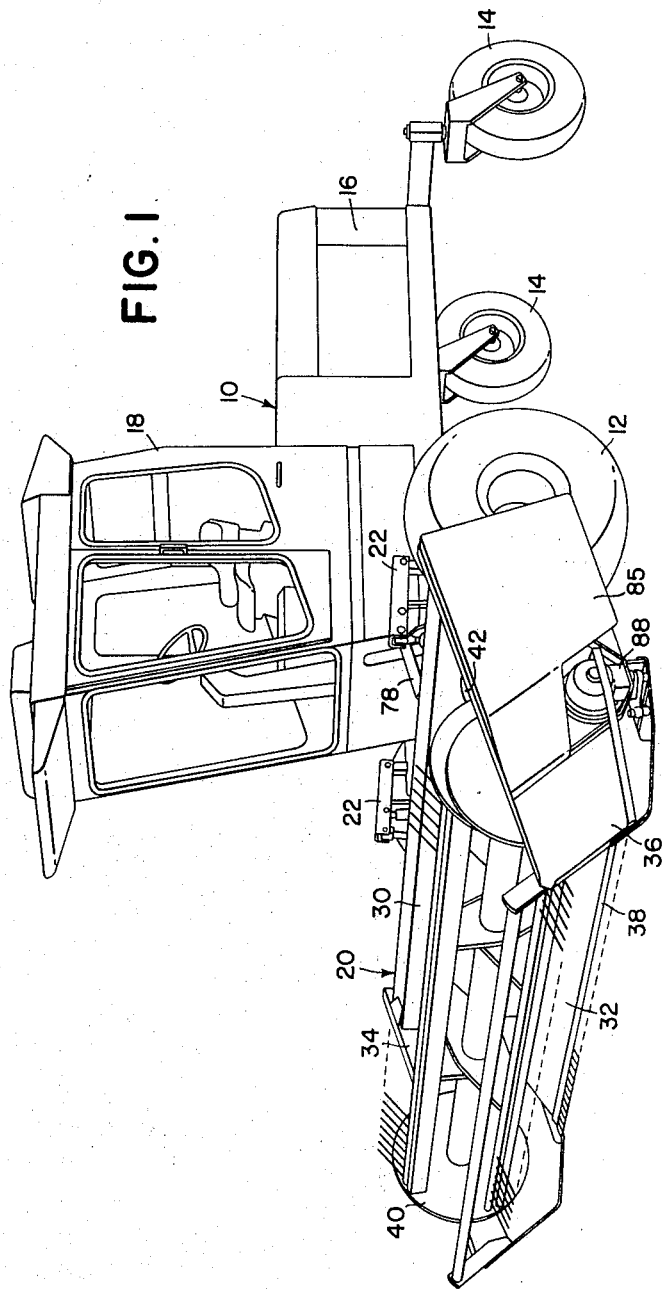

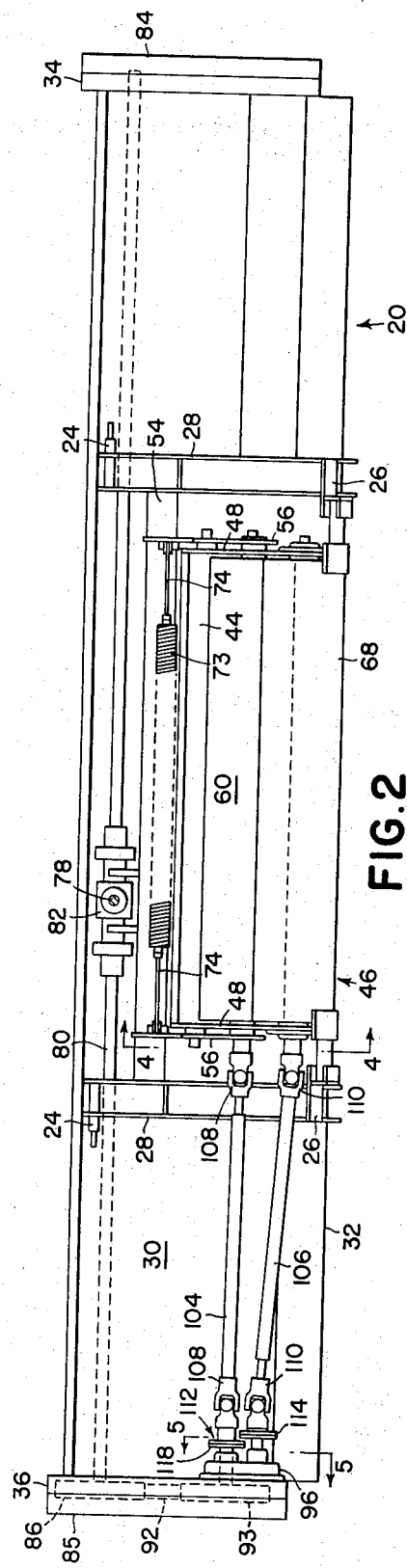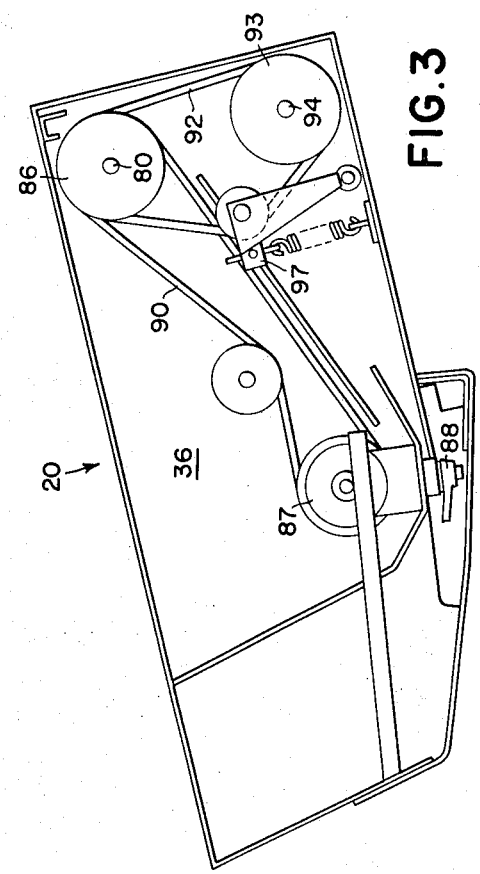

CROP CONDITIONER DRIVE

BACKGROUND OF THE INVENTION

This invention relates to a drive for a pair of crop conditioning rolls on an agricultural harvesting machine.

In harvesting hay or the like, it is well known to condition the crop by passing it between a pair of rolls which crush or crimp the crop material to accelerate the curing thereof. When a self-propelled windrower is used to harvest the crop, the crop is converged toward the center of the platform discharged rearwardly. In such a machine, it is known to mount the crop conditioner unit on the platform rearwardly of the discharge opening, so that the crop passes between a pair of conditioner rolls before it is deposited on the ground in a windrow. Generally, the crop conditioner rolls in such a conditioner unit have been driven by chain drives on the side of the conditioner unit. However, one of the conditioner rolls is conventionally adjustable toward and away from the other to allow for different thickness in the mat of crop material passing between the rolls, and the fact that one of the rolls is shiftable has complicated the drives for the rolls, particularly when intermeshing rolls are utilized. Also, considerable power is required to drive the conditioner rolls, and previous drives have experienced substantial durability problems.

SUMMARY OF THE INVENTION

According to the present invention, an improved drive is provided for driving a pair of crop conditioner rolls on a harvesting machine. More specifically, the conditioner rolls are driven by a pair of transversely extending drive shafts, which have their inner ends connected directly to the respective conditioner rolls and their outer ends driven in opposite directions by a drive system on the side of the machine.

An important feature of the invention resides in the provision of a gearbox on the side of the machine with two oppositely driven output shafts, which are connected to the respective conditioner roll drive shafts. Also, universal joints are provided in the conditioner roll drive shafts to accommodate any misalignment between the conditioner rolls and the gearbox output shafts and also to accommodate the vertical adjustment of the shiftable conditioner roll.

Still another feature of the invention resides in the provision of timing means in at least one of the conditioner roll drive shafts to permit adjustment of the angular relationship of one roll to the other, which is particularly desirable when intermeshing rolls are utilized.

Also according to the invention, the input shaft of the gearbox is driven by the main platform drive shaft, which drives the other header components, by means of a belt drive on the side of the platform.

Still another important feature of the invention resides in the fact that the gearbox drive and the drive shafts provide a rugged and durable drive system to reduce field breakdowns in the conditioner roll drive.

BRIEF DESCRIPTION OF THE DRAWINGS

FIG. 1 is a left front perspective view of a windrower having an auger-type platform equippped with a conditioner unit and the novel drive system for the conditioner rolls.

FIG. 2 is a rear elevation view of the platform.

FIG. 3 is a left side elevation view of the platform without the conditioner unit and with the shielding removed to show the belt drives thereon.

DESCRIPTION OF THE PREFERRED EMBODIMENT

Figure 4:
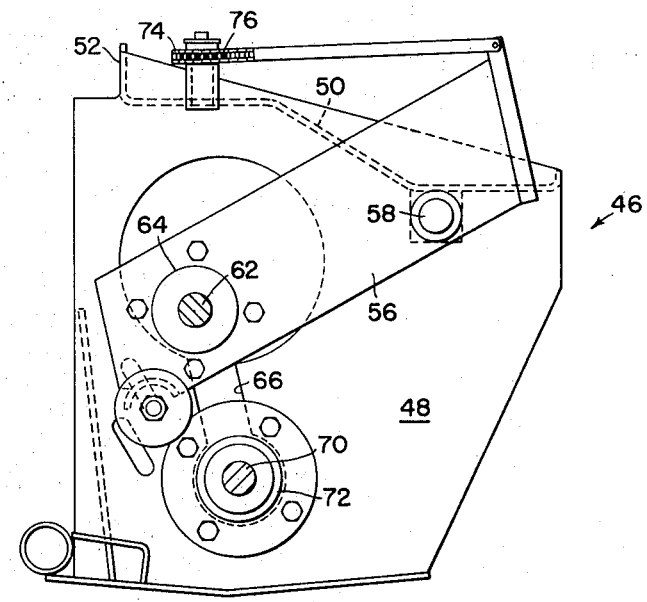
FIG. 4 is a side elevation view of the conditioner unit as viewed generally along the line 4—4 of FIG. 2.

The invention is embodied in a self-propelled windrower having a mobile traction unit or main frame 10 mounted on a pair of forward drive wheels 12 and rear castor wheels 14. The traction unit has a rearward engine compartment 16 with a conventional internal combustion engine (not shown) mounted therein, and a forward central operator's cab 18.

A forward transversely elongated harvesting platform or subframe 20 is carried by the propulsion unit 10 on a pair of vertically adjustable lift mechanisms 22, which extend forwardly from the traction unit inside the opposite drive wheels 12 and connect to the platform at a pair of upper attachment points 24 and lower attachment points 26. As is conventional, the lift mechanisms include hydraulic cylinders, which control the vertical position of the platform, and counterbalance springs, which partly counterbalance the weight of the platform.

The attachment points 24 and 26 are mounted on a pair of upright platform frame members 28 which are attached to a generally upright platform rear wall 30. The lower part of the rear wall curves forwardly to a forwardly and downwardly extending bottom 32, both the rear wall 30 and the bottom 32 extending the width of the platform between opposite, upright side walls 34 and 36.

A transverse cutter bar 38 extends between the opposite side walls 34 and 36 along the leading edge of the bottom 32, and a transverse reel 40 extends between the side walls generally above and forwardly of the cutter bar 38. As is well known, the reel engages the crop and combs it toward the cutter bar 38, which severs the crop from the field, and the crop is thereafter moved upwardly and rearwardly along the platform bottom 32 to a crop converging auger 42. The auger has oppositely wound flights and moves the crop along the bottom to a central area, from which it is propelled rearwardly through a central discharge opening 44 in the rear wall 30. All of the above, represents more or less well known harvesting machine construction.

As is also well known, a crop conditioner unit, indicated in its entirety by the numeral 46, is mounted on the rear wall 30 and receives the crop as it moves through the discharge opening 44. The conditioner unit includes a pair of generally upright side members 48 interconnected by a transverse top member 50, the forward end of which is provided with a generally vertical attachment flange 52. The conditioner unit 46 is removably attachable to the platform by means of fasteners, which attach the flange 52 to the transverse platform frame member 54, which extends between the platform frame members 28 above the discharge opening 44.

A pair of arms 56 are respectively mounted on transversely aligned pivots 58 on the opposite conditioner unit side members 48, so that the arms are free to swing in a generally vertical direction. An upper conditioner roll 60 is supported between the arms 56 forwardly of the arm pivots 58 and include an axial shaft 62 having its opposite ends journaled in bearings 64 carried by the arms 56. The shaft 62 extends through generally vertical slots 66 in the opposite side members 48, which permits the vertical adjustment of the upper roll 60. A lower conditioner roll 68 similarly includes an axial shaft 70 journaled in bearings 72 in the opposite side members 48. As is apparent, the rolls 60 and 68 are adjacent and cooperate to condition the crop as it passes between the rolls, the upper roll being vertically adjustable to accommodate differences in the thickness of the mat of material passing between the rolls.

The upper roll 60 is biased downwardly toward the lower roll 68 by a transverse helical tension spring 73, which is disposed above the top member 50 and has its opposite ends connected to the opposite arms 56 by means of chains 74, which are trained around idler sprockets 76 on opposite sides of the conditioner unit. As is apparent, the chains are attached to the arms above and rearwardly of the arm pivots 58 so that the tension in the chains 74 exerted by the spring 73 urges the forward ends of the arms 56 and the conditioner roll 60 mounted thereon downwardly toward the lower roll 68. The conditioner rolls are preferably of the intermeshing type, and in the illustrated embodiment are of the crimper type, which are conventionally made of steel and have intermeshing flutes, which crimp the crop at regular intervals as it passes between the rolls.

A platform drive shaft 78 extends forwardly from the traction unit 10 and is driven by the engine in known manner. The forward end of the drive shaft 78 is connected to a transverse drive shaft 80 by means of a bevel gearbox 82. As is apparent, the drive shaft 80 extends in both directions from the bevel gearbox 82 to the opposite sides of the platform along the upper portion of the rear wall 30. The rear wall 30 outwardly of the platform frame members 28 is a double wall, and the outer portions of the drive shaft 80 are disposed between the wall panels, the outer portions of the drive shaft being schematically shown in FIG. 2. The right-hand end of the drive shaft provides the input for a pair of drives, which respectively drive the reel 40 and the auger 42 in a conventional manner, the drives being located under a shield 84 on the right side 34 of the platform. The left end of the drive shaft 80 provides the input for driving the conditioner unit 46 and the cutter bar 38, the drive being disposed under a shield 85 on the left side 36 of the platform, the shield 85 being removed in FIG. 3. The cutter bar and conditioning unit drives include a double drive sheave 86 on the outer end of the drive shaft 80, and one of the sheaves of the double sheave 86 is connected to an input sheave 87 for a wobble-type cutter bar driving mechanism 88 by means of a belt 90. The drive mechanism 88 is of known construction and mounted on the left-hand end of the cutter bar 38. A second belt 92 around the drive sheave 86 is trained around and drives a sheave 93 mounted on the input shaft 94 of a gearbox 96 mounted on the left side of the platform adjacent the rear wall 30. A belt tensioning mechanism 97 provides proper belt tension in the drive belt 92.

The gearbox 96 has an upper output shaft 98 directly connected to the input shaft 94 and a lower output shaft 99, which is driven in the opposite direction from the upper output shaft 98 by means of a pair of meshing spur gears 100 and 102 respectively mounted on the shafts 98 and 99. The upper gearbox output shaft is connected to the outer end of an upper roll drive shaft 104, which extends transversely along the rear wall 30 and has its inner end connected to the upper roll shaft 62. Similarly, the lower output shaft 99 is connected to the outer end of a lower roll drive shaft 106, which also extends transversely along the rear wall 30 and has its inner end connected to the lower roll shaft 70. The upper roll drive shaft 104 is provided with a pair of U-joints 108 adjacent its opposite ends to accommodate the vertical adjustment of the upper roll, while the lower roll drive shaft 106 is similarly provided with a pair of universal joints 110, which accommodate misalignment between the gearbox output shaft 99 and the lower conditioner roll.

Figure 5:
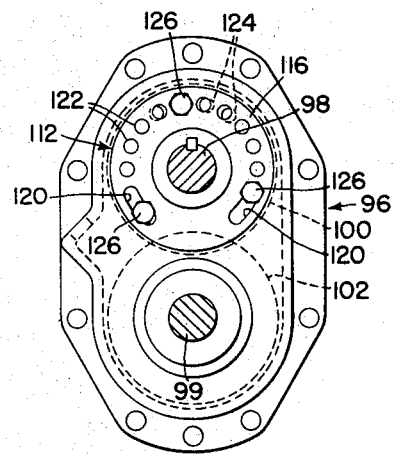
FIG. 5 is a section view through the conditioner roll drive shafts as viewed generally along the line 5—5 of FIG. 2.

The outer ends of the drive shafts 104 and 106 are respectively connected to the gearbox output shafts 98 and 99 by timing mechanisms 112 and 114 respectively. The timing mechanisms 112 and 114 permit a small degree of angular adjustment between the gearbox output shafts and the roll drive shafts, only the upper timing mechanism 112 being shown in detail in FIG. 5. The timing mechanism 112 includes a circular inner plate 116, coaxially attached to the drive shaft 104, and a similar circular outer plate 118 attached to the shaft 98 and disposed adjacent to the inner plate 116. The inner plate has a pair of arcuate slots 120, equidistantly offset from the axis of the plate, and a plurality of equiangularly spaced transverse holes offset from the center plate the same distance as the slots 120. A plurality of transverse holes 124 are provided in the outer plate 118, the holes 124 being offset from the center of the plate the same distance as the holes 122, but spaced at different angular intervals. A pair of fasteners 126 hole through the slots 120 and through two of the holes in the plate 118, the slots permitting relative angular adjustment between the plates 116 and 118 a distance equal to the length of the slots. The plates can be locked in the selected relative position by a third fastener 126 extending through a be 122 in the plate 116 and a hole 124 in the plate 118, the different angular spacing between the holes allowing one hole in one plate to be substantially aligned with a hole in the other plate regardless of the different angular positions of the plates. In operation, the timing mechanisms 112 and 114 can be utilized to adjust the relative angular positions of the drive shafts 104 and 106 and thereby adjust the relationship between the upper and lower conditioner rolls, which, in the preferred embodiment are fluted and intermesh, the adjustment provided by the timing mechanism providing for a proper mesh of the conditioner rolls.

As is apparent, the drive for the conditioner roll is provided through the platform drive shaft 78, the transverse drive shaft 80, the belt 92, the gearbox 96, and thence to the two drive shafts 104 and 106, which are respectively directly connected to the upper and lower conditioner rolls 60 and 68. As is also apparent, there is no problem with changing relationships in the drives to the rolls as the upper roll moves toward and away from the lower roll, and the drive shafts 104 and 106 provide a simple and durable drive to the respective conditioner rolls.

We claim:

1. In a harvesting machine having a mobile main frame with a power source mounted thereon and driving a forwardly extending platform drive shaft, and including a forward transversely elongated harvesting platform having a rear wall with a central crop transfer opening and a crop conditioner unit mounted on the platform for receiving crops moving through the opening and including a first transverse conditioning roll journaled on the conditioning unit, a second rotatable conditioning roll parallel to and cooperating with the first roll and means mounting the second roll on the unit for adjustment toward and away from the first roll to vary the clearance between the rolls, the improvement comprising: a transverse drive shaft mounted on the platform and having an outer end adjacent one side of the platform; means drivingly connecting the platform drive shaft to the transverse drive shaft; first and second roll drive shafts extending laterally adjacent to the platform rear wall and having their inner ends respectively connected to the first and second conditioner rolls and their outer ends disposed adjacent to said one side of the platform; a gearbox mounted on the platform adjacent said one side and including an input shaft and first and second output shafts respectively connected to the first and second roll drive shafts, the first output shaft being connected to and driven in the opposite direction from the second output shaft by gear means; and drive means mounted on said one side of the platform for drivingly connecting the outer end of the transverse drive shaft to the gearbox input shaft.

2. The invention defined in claim 1 wherein said drive means comprises a belt drive including a drive sheave mounted on the transverse drive shaft and a driven sheave mounted on the gearbox input shaft.

3. The invention defined in claim 2 wherein the gearbox input shaft is directly connected to the second gearbox output shaft.

4. The invention defined in claim 1 and including timing means associated with at least one of said roll drive shafts for angularly adjusting one end of the shaft relative to the other and thereby angularly adjust one roll while maintaining the angular position of the other to time the angular relationship between the rolls.

5. The invention defined in claim 1 wherein the first and second roll drive shafts respectively include a pair of universal joints.

6. The invention defined in claim 1 wherein the second drive shaft includes a pair of universal joints operative to accommodate vertical adjustment of the second conditioner roll.

7. In a harvesting machine having a mobile frame, a power source and a pair of cooperating crop conditioning rolls rotatably mounted on the frame for conditioning the crop as it passes between the rolls, one of said rolls being mounted for shifting toward and away from the other roll to vary the clearance between the rolls, the improvement comprising: a gearbox mounted on the frame and having an input shaft, operatively connected to and driven by the power source, and a pair of output shafts driven in opposite directions; a first drive shaft operatively connecting one of said output shafts to said one shiftable roll to drive the roll in one direction and including a pair of universal joints adapted to accommodate the shifting of the roll; a second drive shaft operatively connecting the other output shaft to the other roll to drive said roll in the opposite direction from said one roll; and timing means associated with at least one of said roll drive shafts for angularly adjusting one end of the shaft relative to the other and thereby angularly adjust one roll while maintaining the angular position of the other to time the angular relationship between the rolls.

* * * * *